US011087767B2

(12) United States Patent
Hatori

(10) Patent No.: US 11,087,767 B2
(45) Date of Patent: Aug. 10, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Toru Hatori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 139 days.

(21) Appl. No.: 16/392,690

(22) Filed: Apr. 24, 2019

(65) Prior Publication Data

US 2020/0160868 A1 May 21, 2020

(30) Foreign Application Priority Data

Nov. 16, 2018 (JP) .............................. JP2018-215167

(51) Int. Cl.
*G10L 17/02* (2013.01)

(52) U.S. Cl.
CPC .................................... *G10L 17/02* (2013.01)

(58) Field of Classification Search
CPC ....................................................... G10L 17/02
See application file for complete search history.

(56) References Cited

U.S. PATENT DOCUMENTS

| | | | |
|---|---|---|---|
| 7,599,836 B2 | 10/2009 | Ichikawa et al. | |
| 7,613,610 B1* | 11/2009 | Zimmerman | ......... G16H 10/60 704/235 |
| 8,332,227 B2* | 12/2012 | Maes | ..................... H04L 41/00 704/270.1 |
| 8,498,865 B1* | 7/2013 | Shostak | .................. G10L 15/19 704/252 |
| 8,862,473 B2 | 10/2014 | Shinnishi et al. | |
| 10,134,400 B2* | 11/2018 | Ziv | ......................... G10L 17/00 |
| 10,325,601 B2* | 6/2019 | Khoury | ................... G06N 7/005 |
| 10,657,954 B2* | 5/2020 | Mertens | .................. G10L 15/26 |
| 2005/0288927 A1* | 12/2005 | Kim | ........................ G10L 15/22 704/235 |
| 2011/0112835 A1* | 5/2011 | Shinnishi | ............... G10L 15/18 704/235 |
| 2013/0144619 A1* | 6/2013 | Lord | ....................... H04M 3/56 704/235 |
| 2013/0144623 A1* | 6/2013 | Lord | .................... G09B 21/006 704/249 |
| 2014/0046666 A1* | 2/2014 | Nishiyama | ............. G10L 17/06 704/249 |

(Continued)

FOREIGN PATENT DOCUMENTS

| | | |
|---|---|---|
| JP | 4082611 B2 | 4/2008 |
| JP | 2012-208630 A | 10/2012 |
| JP | 5257330 B2 | 8/2013 |

*Primary Examiner* — Mohammad K Islam
(74) *Attorney, Agent, or Firm* — Oliff PLC

(57) ABSTRACT

An information processing apparatus includes a receiving unit, one or more first identifying units, a second identifying unit, and an output unit. The receiving unit receives speech information. The one or more first identifying units identify a speaker from the speech information. The second identifying unit identifies an organization to which the speaker belongs. The output unit outputs information regarding the speech information to an output destination corresponding to the organization.

17 Claims, 10 Drawing Sheets

(56) References Cited

U.S. PATENT DOCUMENTS

| | | | |
|---|---|---|---|
| 2015/0302857 A1* | 10/2015 | Yamada | G06Q 30/0633 |
| | | | 704/275 |
| 2015/0365759 A1* | 12/2015 | Dimitriadis | G06F 3/165 |
| | | | 381/71.1 |
| 2016/0125876 A1* | 5/2016 | Schroeter | G10L 25/72 |
| | | | 704/226 |
| 2016/0275952 A1* | 9/2016 | Kashtan | G10L 17/22 |
| 2018/0197536 A1* | 7/2018 | Liu | H04L 67/06 |
| 2018/0218734 A1* | 8/2018 | Somech | G10L 15/005 |
| 2018/0342251 A1* | 11/2018 | Cohen | G10L 13/08 |
| 2019/0258704 A1* | 8/2019 | Mertens | G10L 15/22 |
| 2019/0259387 A1* | 8/2019 | Mertens | G06F 40/166 |
| 2020/0105280 A1* | 4/2020 | Ziv | G10L 17/00 |
| 2020/0145241 A1* | 5/2020 | Anderson | G10L 17/00 |
| 2020/0243094 A1* | 7/2020 | Thomson | G10L 15/22 |
| 2020/0321004 A1* | 10/2020 | Kobayashi | G10L 15/20 |
| 2021/0027789 A1* | 1/2021 | Grancharov | G10L 17/06 |

* cited by examiner

| USER ID | SPEAKER | COMPANY | SPEAKER INFORMATION |
|---|---|---|---|
| 1 | YAMADA | COMPANY A | VOICEPRINT 1 |
| 2 | TANAKA | COMPANY A | VOICEPRINT 2 |
| 3 | OKAWA | COMPANY B | VOICEPRINT 3 |

| No | DATE AND TIME | USER ID | COMPANY |
|---|---|---|---|
| 1 | UTTERANCE TIME | 1 | COMPANY A |
| 2 | UTTERANCE TIME | 2 | COMPANY B |
| 3 | UTTERANCE TIME | 3 | COMPANY C |

| No | COMPANY NAME | PATH |
|---|---|---|
| 1 | A | C:\A |
| 2 | AB | C:\AB |

| COMPANY X OUTPUT INFORMATION | |
|---|---|
| SPEECH INFORMATION | 0xAB3··· |
| RECOGNITION RESULT | "SPEECH···" |
| AI INFORMATION | http://··· |

710, 720, 730

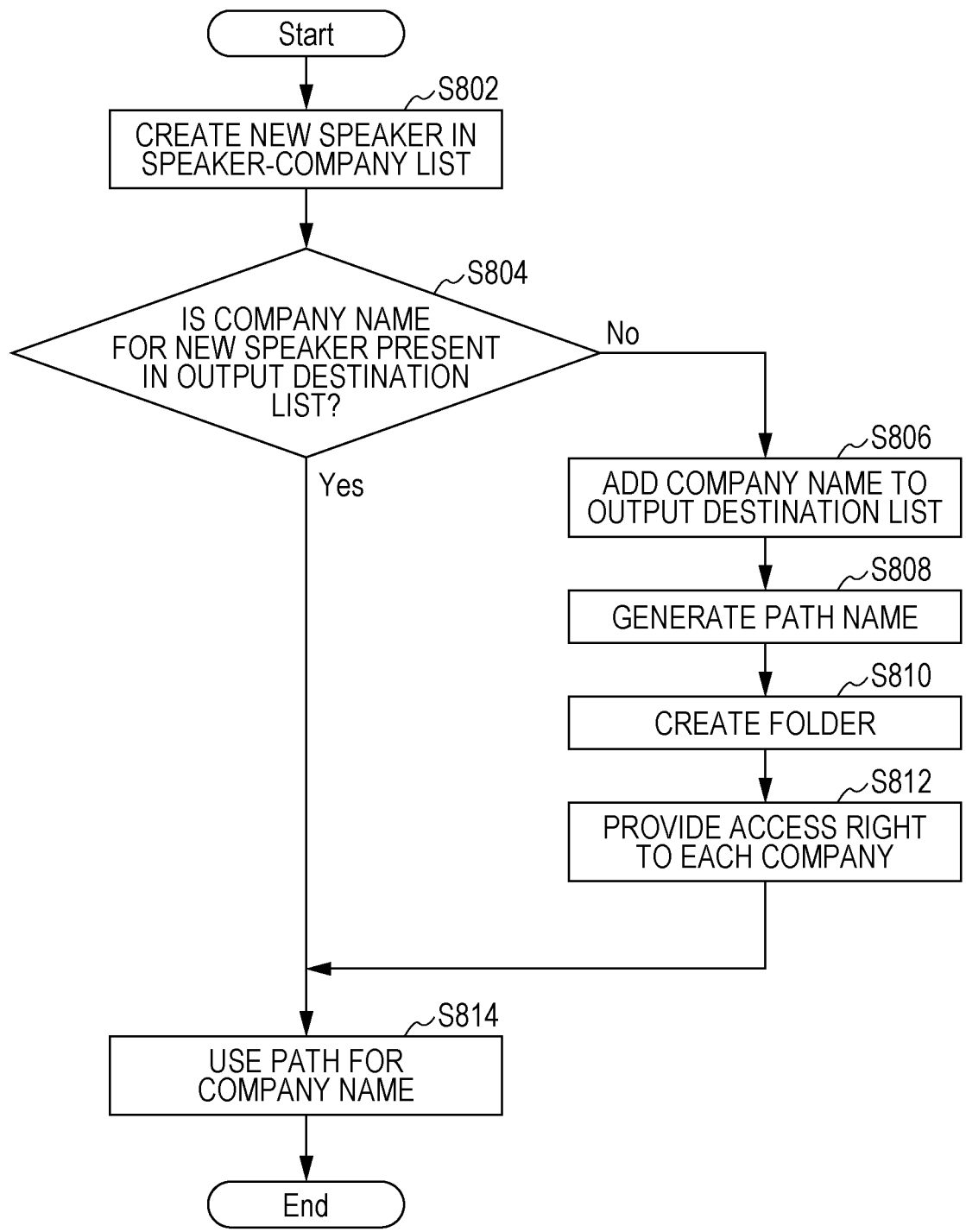

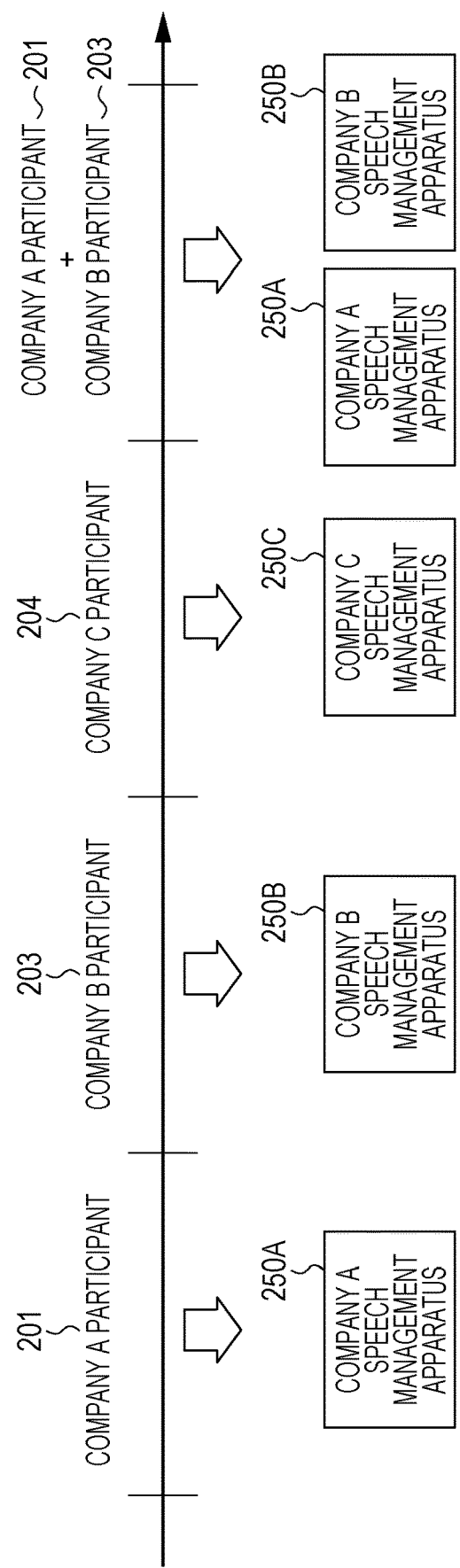

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-215167 filed Nov. 16, 2018.

BACKGROUND

(i) Technical Field

The present disclosure relates to an information processing apparatus and a non-transitory computer readable medium.

(ii) Related Art

In Japanese Patent No. 5257330, a comment recording apparatus that includes a speech input device and a speech output device, for recording and playing back comment speech is disclosed. The comment recording apparatus includes a speech obtaining unit that obtains comment speech as speech data by the speech input device and registers the obtained speech data into a speech database for each topic specified by topic specifying means from among a plurality of topics registered in advance in a topic database and each speaker identified from the speech data, a speech recognition unit that performs speech recognition on the speech data registered in the speech database to obtain text information, a morphological analysis unit that performs morphological analysis on the text information obtained by the speech recognition unit and registers a keyword extracted from obtained words into a keyword database, together with a topic and a speaker registered along with speech into the speech database, and a display generation unit that displays the keyword in a matrix while relating the keyword to a topic and a speaker.

In Japanese Unexamined Patent Application Publication No. 2012-208630, a speech management system, a speech management method, and a speech management program for creating record about comments at a meeting or the like and for supporting smooth proceedings progress are disclosed. A controller of a meeting support server acquires sound, performs speech recognition processing, and records a recognition result into a comment management information storage unit. Then, the controller performs keyword extraction processing using the comment management information storage unit. The controller performs processing for deleting a proceedings article when the controller determines that there is proceedings progress in meeting progress management processing carried out based on the keyword. In explanation display management processing carried out based on the keyword, the controller searches for reference information and outputs display candidates on a client terminal.

In Japanese Patent No. 4082611, a system for recording speech by a plurality of speakers, including microphones individually provided for the speakers; a speech processing unit that obtains two-channel speech signals through the microphones, performs speech processing on speech signals obtained from a specific microphone, out of the obtained speech signals, and mixes the speech signals for each of the channels, and an analysis unit that analyzes the speech signals that have been subjected to the speech processing and the mixing by the speech processing unit and identifies a microphone that records the speech signal for individual speech segments, is disclosed. The speech processing unit performs, as the speech processing, at least one of first processing of inverting the polarity of one of the two-channel speech signals among the speech signals obtained from the specific microphone, second processing of changing a signal power of one of the two-channel speech signals at a specific ratio among the speech signals obtained from the specific microphone, and third processing of delaying one of the two-channel speech signals among the speech signals obtained from the specific microphone. In a case where a difference between the two-channel speech signals respectively mixed is obtained and the signal power of a speech signal in a specific speech segment increases, the analysis unit determines that the speech signal in the speech segment is a speech signal on which the first processing has been performed, and identifies the microphone that has recorded the speech signal. In a case where the signal power of one of the two-channel speech signals respectively mixed is changed in an opposite direction at a ratio corresponding to the second processing, obtains the sum of the two-channel speech signals, and the signal power of a speech signal in a specific speech segment increases to an integral multiple of the original signal, the analysis unit determines that the speech signal in the speech segment is the speech signal on which the second processing has been performed, and identifies the microphone that has recorded the speech signal, in a case where after processing for correcting a delay by the speech processing unit for one of the two-channel speech signals respectively mixed, the sum of the two-channel speech signals is obtained, and the signal power of a speech signal in a specific speech segment is increased to an integral multiple of the original signal power, the analysis unit determines that the speech signal in the speech segment is a speech signal on which the third processing has been performed and specifies the microphone that has recorded the speech signal.

SUMMARY

In the case where a plurality of organizations collaborate in research and development or the like, data is generated by the collaboration. A contract that resultant data are owned by individual organizations may be made.

However, if resultant data is speech information of a conversation and an organization may not be identified from a speaker, the whole speech information needs to be stored, and an administrator needs to categorize the speech information according to organizations.

Aspects of non-limiting embodiments of the present disclosure relate to an information processing apparatus and a non-transitory computer readable medium that are capable of outputting information obtained based on speech information of a speaker to an output destination corresponding to an organization.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a receiving unit, one or more first identifying units, a second identifying unit, and an output unit. The receiving unit receives speech information. The one or more first identifying units identify a speaker from the speech information. The second identifying unit identifies an organization to which the speaker belongs. The output unit outputs information regarding the speech information to an output destination corresponding to the organization.

BRIEF DESCRIPTION OF DRAWINGS

Exemplary embodiments of the present disclosure will be described in detail based on the following figures, wherein:

FIG. 4 is an explanatory diagram illustrating an example of a data structure of a speaker-company list;

FIG. 5 is an explanatory diagram illustrating an example of a data structure of a meeting speaker list;

FIG. 6 is an explanatory diagram illustrating an example of a data structure of an output destination list;

FIG. 7 is an explanatory diagram illustrating an example of a data structure of company X output information;

FIG. 8 is a flowchart illustrating an example of a process according to the first exemplary embodiment;

FIG. 9 is an explanatory diagram illustrating an example of a process according to the first exemplary embodiment;

DETAILED DESCRIPTION

Hereinafter, various exemplary embodiments of the present disclosure will be explained with reference to drawings.

First Exemplary Embodiment

Figure 1:
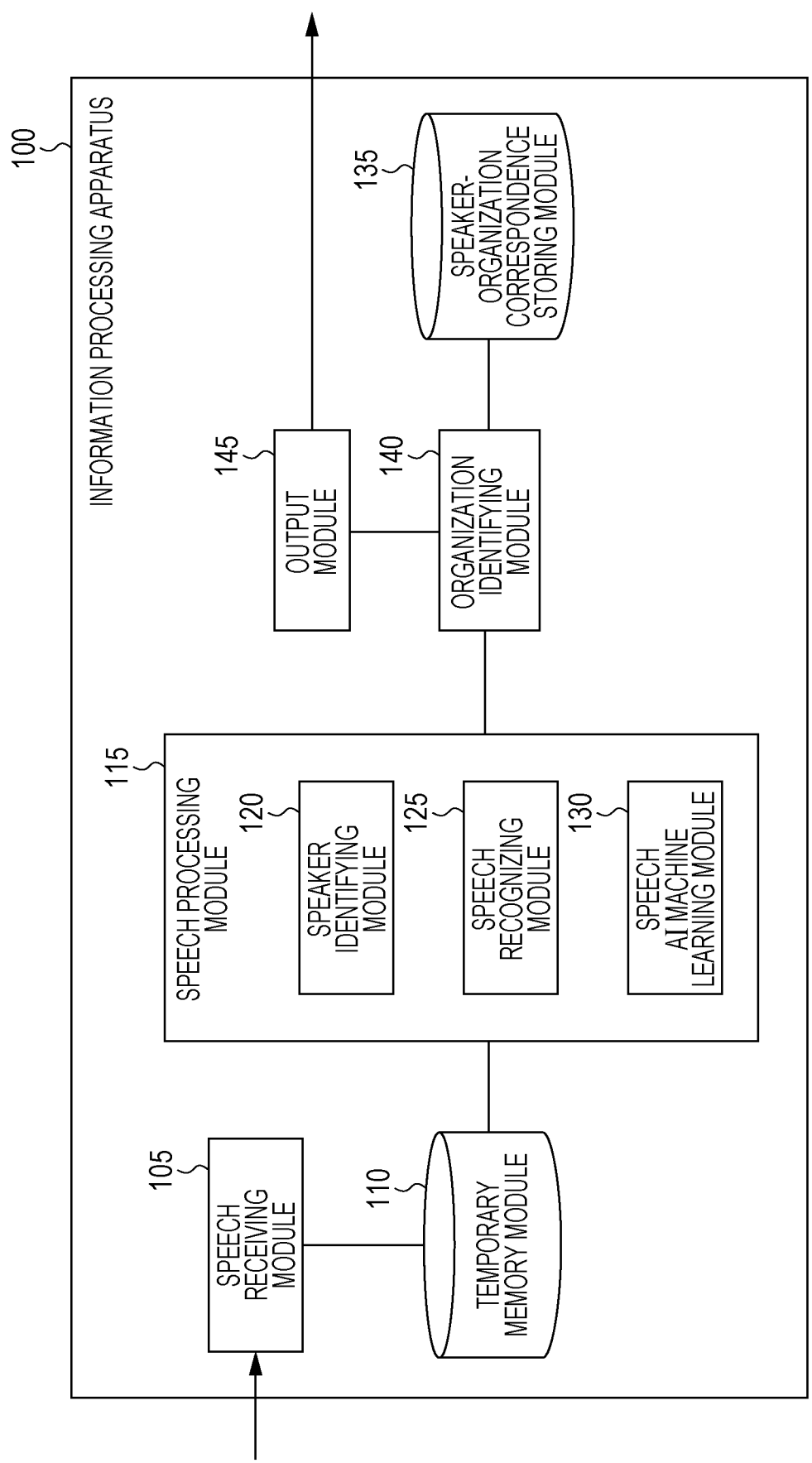
FIG. 1 is a conceptual module configuration diagram illustrating an example of a configuration according to a first exemplary embodiment.

FIG. 1 is a conceptual module configuration diagram illustrating an example of a configuration according to a first exemplary embodiment.

In general, the term "module" refers to a component such as software (a computer program), hardware, or the like, which may be logically separated. Therefore, a module in an exemplary embodiment refers not only to a module in a computer program but also to a module in a hardware configuration. Accordingly, through exemplary embodiments, a computer program for causing the component to function as a module (a program for causing a computer to perform each step, a program for causing a computer to function as each unit, and a program for causing a computer to perform each function), a system, and a method are described. For convenience of explanation, the terms "store", "cause something to store", and other equivalent expressions will be used. When an exemplary embodiment relates to a computer program, the terms and expressions represent "causing a storing device to store" or "controlling a storing device to store". A module and a function may be associated on a one-to-one basis. In the actual implementation, however, one module may be implemented by one program, multiple modules may be implemented by one program, or one module may be implemented by multiple programs. Furthermore, multiple modules may be executed by one computer, or one module may be executed by multiple computers in a distributed computer environment or a parallel computer environment. Moreover, a module may include another module. In addition, hereinafter, the term "connection" may refer to logical connection (such as data transfer, instruction, cross-reference relationship between data, and logging in) as well as physical connection. The term "being predetermined" represents being set prior to target processing being performed. "Being predetermined" represents not only being set prior to processing in an exemplary embodiment but also being set even after the processing in the exemplary embodiment has started, in accordance with the condition and state at that time or in accordance with the condition and state during a period up to that time, as long as being set prior to the target processing being performed. When there are plural "predetermined values", the values may be different from one another, or two or more values (obviously, including all the values) may be the same. The term "in the case of A, B is performed" represents "a determination as to whether it is A or not is performed, and when it is determined to be A, B is performed", unless the determination of whether it is A or not is not required. Furthermore, in the case where objects such as "A, B, and C" are listed, they are exemplified as a list unless otherwise stated and a case where only one of them is selected (for example, only A is selected) is included.

Moreover, a "system" or an "apparatus" may be implemented not only by a plurality of computers, hardware, apparatuses, or the like connected through a communication unit such as a network (including one-to-one communication connection), but also by a single computer, hardware, apparatus, or the like. The terms "apparatus" and "system" are used as synonymous terms. Obviously, the term "system" does not include social "mechanisms" (social system), which are only artificially arranged.

Furthermore, for each process in a module or for individual processes in a module performing a plurality of processes, et information read from a storing device and a processing result written to the storing device after the process is performed. Therefore, the description of reading from the storing device before the process is performed or the description of writing to the storing device after the process is performed may be omitted. The storing device may be a hard disk drive, a random access memory (RAM), an external storage medium, a storing device using a communication line, a register within a central processing unit (CPU), or the like.

An information processing apparatus 100 according to the first exemplary embodiment includes, as illustrated in the example of FIG. 1, a speech receiving module 105, a temporary memory module 110, a speech processing module 115, a speaker-organization correspondence storing module 135, an organization identifying module 140, and an output module 145.

The information processing apparatus 100 has a function for outputting information regarding speech information of a plurality of speakers belonging to different organizations to output destinations of the corresponding organizations. For example, the information processing apparatus 100 performs processing for controlling output of results of collaboration with other companies.

The speech receiving module 105 is connected to the temporary memory module 110. The speech receiving module 105 receives speech information of a speaker. For example, the speech receiving module 105 may be a microphone. The speech receiving module 105 may receive speech information from a microphone or may read speech information from a recording medium on which speech information is recorded.

Furthermore, the speech receiving module 105 may receive speech information of a speaker who belongs to a first organization and speech information of a speaker who belongs to a second organization.

More particularly, the speech receiving module 105 may receive a conversation in a collaborative work for speech recognition by the first organization and the second organization.

"Collaborative works" include cooperation, collaboration, cooperative works, collaborative researches, and the like.

The temporary memory module 110 is connected to the speech receiving module 105 and the speech processing module 115. The temporary memory module 110 stores speech information received by the speech receiving module 105. Furthermore, the temporary memory module 110 stores processing results of the speech processing module 115 speaker identifying module 120, a speech recognizing module 125, a speech AI machine learning module 130). After the output module 145 outputs the above information, the temporary memory module 110 deletes the output information.

The speech processing module 115 includes the speaker identifying module 120, the speech recognizing module 125, and the speech AI machine learning module 130 and is connected to the temporary memory module 110 and the organization identifying module 140. The speech processing module 115 performs processing regarding speech information.

The speaker identifying module 120 identifies, based on speech information received by the speech receiving module 105, a speaker (a person who produces speech of the speech information). An existing technique (for example, speaker verification, speaker authentication, speaker identification, speaker recognition, or the like) may be used to identify a speaker. For example, speech of a speaker may be stored in advance as a template (for example, a voiceprint), so that the speech of the speaker may be compared with speech information received by the speech receiving module 105.

The speech recognizing module 125 recognizes speech information received by the speech receiving module 105. An existing technique may be used to recognize speech information. Specifically, speech information is converted into character information (text).

The speech AI machine learning module 130 performs machine learning based on speech information received by the speech receiving module 105. For example, the speech AI machine learning module 130 may perform machine learning for identifying a speaker, based on speech information received by the speech receiving module 105 and processing results of the speaker identifying module 120. Furthermore, the speech AI machine learning module 130 may perform machine learning for performing speech recognition, based on speech information received by the speech receiving module 105 and processing results of the speech recognizing module 125.

The speaker identifying module 120 or the speech recognizing module 125 may be artificial intelligence using AI data (model) subjected to machine learning by the speech AI machine learning module 130.

The speaker-organization correspondence storing module 135 is connected to the organization identifying module 140. The speaker-organization correspondence storing module 135 stores a table in which a speaker and an organization are associated with each other (specifically, a speaker-company list 400 in an example of FIG. 4 or the like), a table in which an organization and an output destination are associated with each other (specifically, an output destination list 600 in an example of FIG. 6 or the like), and the like.

The organization identifying module 140 is connected to the speech processing module 115, the speaker-organization correspondence storing module 135, and the output module 145. The organization identifying module 140 identifies an organization to which a speaker who is identified by the speaker identifying module 120 belongs. For example, the organization identifying module 140 may identify an organization on the basis of a user, using a table in which a speaker and an organization are associated with each other stored in the speaker-organization correspondence storing module 135.

The output module 145 is connected to the organization identifying module 140. The output module 145 outputs information regarding speech information to an output destination corresponding to an organization identified by the organization identifying module 140.

The "output destination corresponding to an organization" represents a storing unit to which a corresponding organization owns the access right. For example, an "output destination corresponding to an organization" may be a server owned by the organization or a region on a cloud providing a storage service that is accessible by the organization.

Furthermore, "information regarding speech information" is one or a combination of speech information received by the speech receiving module 105, a recognition result of the speech information (a recognition result by the speech recognizing module 125), and a result of machine learning using the speech information (AI data as a result of learning by the speech AI machine learning module 130).

Furthermore, the output module 145 may output information regarding speech information to an apparatus accessible by an organization identified by the organization identifying module 140.

In the case where a plurality of organizations are identified by the organization identifying module 140, the output module 145 may output information regarding speech information to an apparatus accessible by the plurality of organizations.

The "case where a plurality of organizations are identified by the organization identifying module 140" includes a case where speakers belong to different organizations. More specifically, examples of the "case where a plurality of organizations are identified by the organization identifying module 140" include a case where a speaker belongs to different organizations, a case where some speakers belong to the one organization but some speakers belong to different organizations", and the like.

In the case where a person belongs to a plurality of organizations, the output module 145 outputs information to one of (1) an apparatus accessible by the plurality of organizations to which the speaker belongs, (2) an apparatus accessible by one of the plurality of organizations (one of the organizations may be determined in advance or may be selected by an administrator, the speaker, or the like), and (3) an apparatus accessible by organizations that conduct collaborative research or collaborative development.

Figure 2:
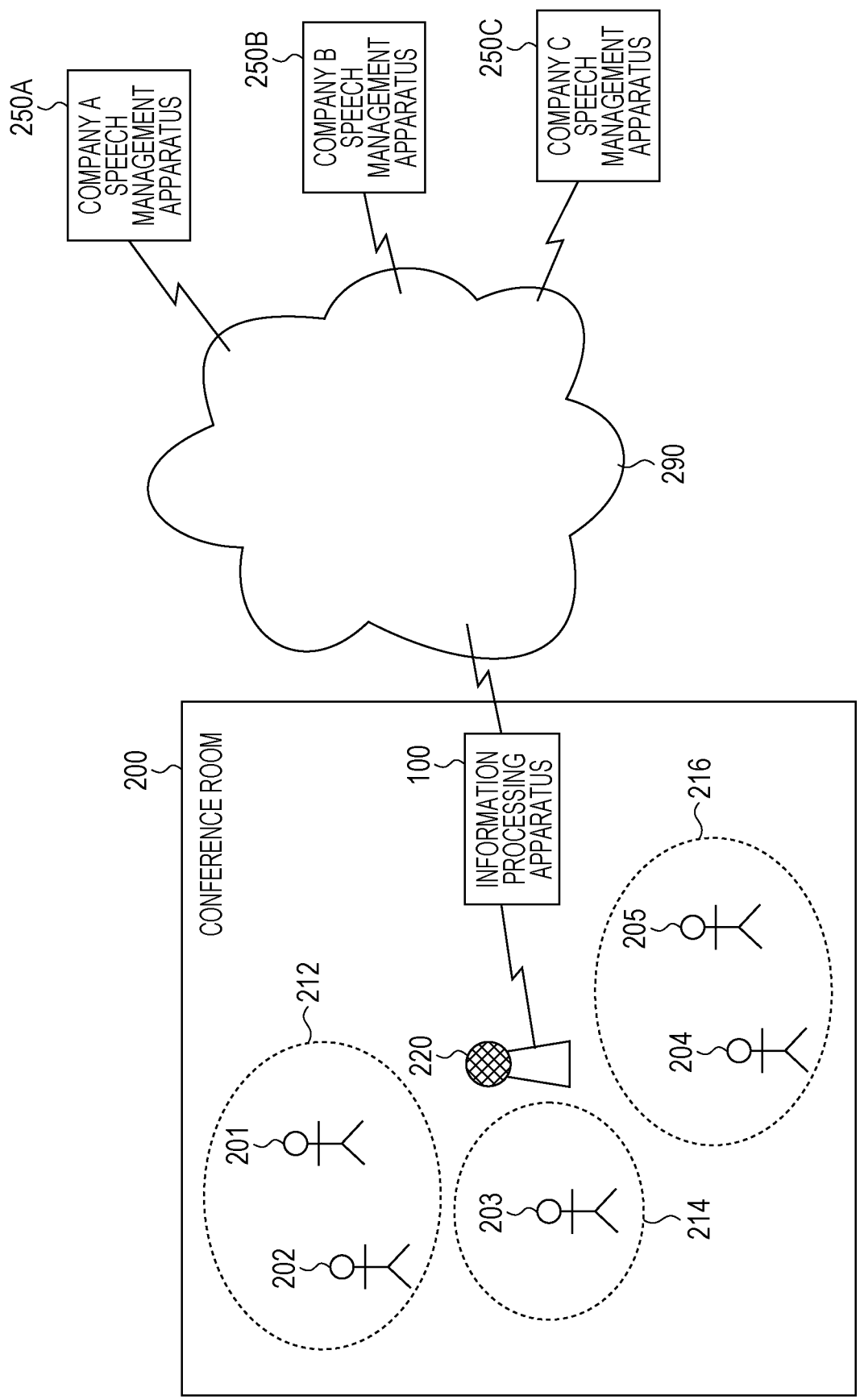
FIG. 2 is an explanatory diagram illustrating an example of a system configuration in an exemplary embodiment.

FIG. 2 is an explanatory diagram illustrating an example of a system configuration in the first exemplary embodiment.

The information processing apparatus 100 in a conference room 200, a company A speech management apparatus 250A, a company B speech management apparatus 250B, and a company C speech management apparatus 250C are connected to one another via a communication line 290.

The information processing apparatus 100 and a microphone 220 are installed at the conference room 200, and a company A participant group 212, a company B participant group 214, and a company C participant group 216 are present in the conference room 200. The company A participant group 212 includes a company A participant 201 and a company A participant 202. The company B participant group 214 includes a company B participant 203. The company C participant group 216 includes a company C participant 204 and a company C participant 205. All the participants including the company A participant 201 and so on may be speakers. For example, the company A participant 201 and so on are employees, such as researchers, research participants, and the like, who belong to corresponding organizations (the company A and so on). People "who belong to corresponding organizations" are not necessarily employees under employment relationships. People "who belong to corresponding organizations" may be people assigned by the corresponding organizations, such as part-time workers, casual workers, temporary workers, contract workers, or the like.

For example, there may be a demand to categorize data generated in a collaboration with other companies according to the companies and manage the categorized data.

A case where an experiment of speech recognition in a meeting is conducted in collaboration with other companies will be assumed. In this experiment, outputs are generated as in a list provided below, and there may be a demand to categorize the outputs according to the companies and manage the categorized outputs, depending on experimental conditions.

Example of Outputs (1) speech data of utterances in a meeting;
(2) text data obtained by speech recognition of speech data; and
(3) learned AI data obtained by experiment of speech recognition.

To make sure whether the above technique is able to put into practice, the experiment is conducted in a real meeting. Therefore, data regarding the contents of the meeting needs to be prevented from leaking to other companies. In the case where an exemplary embodiment of the present disclosure is not adopted (in a so-called related art) data in the above list of (1), (2), and (3) used or generated in speech recognition processing are cleaned up every time before an experiment starts, and after the experiment is completed, an administrator stores the data separately for each company.

Thus, there are problems that (a) experimental data needs to be managed separately, which is troublesome, and (b) the AI data are cleared every time that an experiment is conducted, which hinders learning.

The information processing apparatus 100 stores information regarding speech information of the company A participant group 212 into the company A speech management apparatus 250A, stores information regarding speech information of the company B participant group 214 into the company B speech management apparatus 250B, and stores information regarding speech information of the company C participant group 216 into the company C speech management apparatus 250C.

For example, the information processing apparatus 100 performs processing described below.

First, only one company attends a meeting.

If the next speaker belongs to the company, an output destination is not changed.

If the next speaker belongs to a different company, a speech file used for recognition, a recognition result, and learned AI data are disposed of (deleted from the temporary memory module 110), and switching to a different output destination is performed.

Alternatively, as pre-processing, as explained in a second exemplary embodiment described later, a speech processing module 1115 may be provided for each company, and after the company is identified, the speech processing module 1115 may be separately called. In this case, processing is performed by a speaker identifying module 1120 of the speech processing module 1115, and a processing result of the speaker identifying module 1120 of the speech processing module 1115 with which a speaker is not identified is disposed of.

Subsequently, if another new company attends the meeting, a switched new speech processing module 1115 is used.

Figure 3:
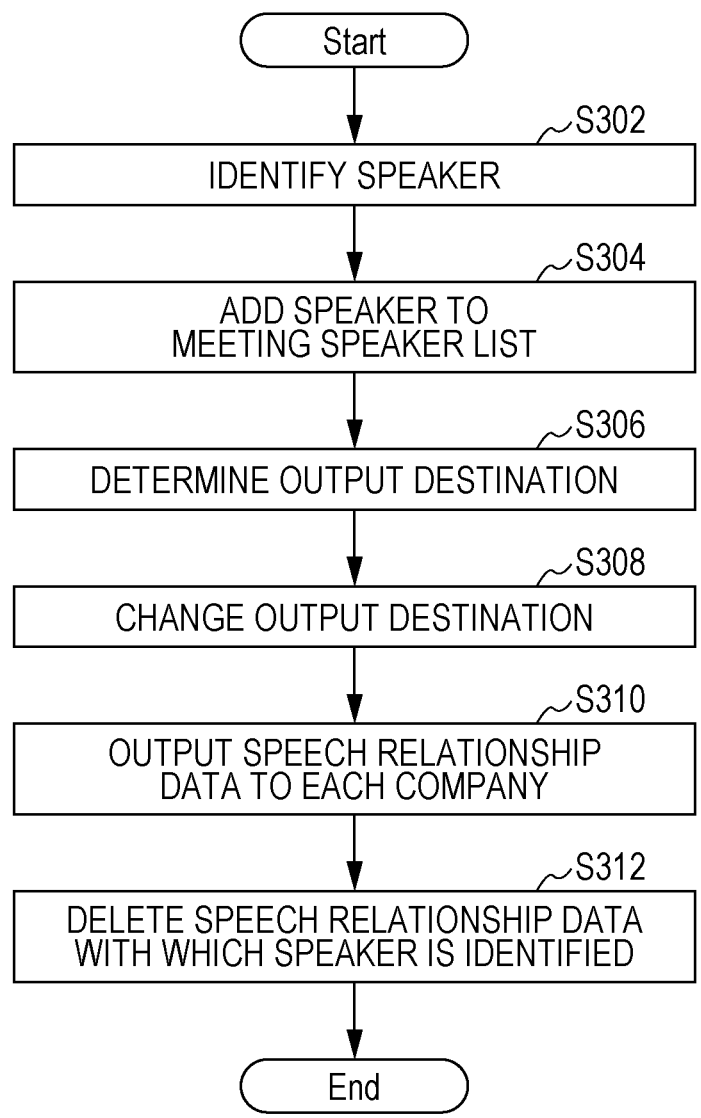
FIG. 3 is a flowchart illustrating an example of a process according to the first exemplary embodiment.

FIG. 3 is a flowchart illustrating an example of a process according to the first exemplary embodiment.

In step S302, the speaker identifying module 120 identifies a speaker. For example, a speaker-company list 400 is used. FIG. 4 is an explanatory diagram illustrating an example of a data structure of the speaker-company list 400. The speaker-company list 400 includes a user ID field 410, a speaker field 420, a company field 430, and a speaker information field 440. In the first exemplary embodiment, information (user identification (user ID)) for uniquely identifying a user who may serve as a speaker is stored in the user ID field 410. The name of the user is stored in the speaker field 420. A company to which the user belongs is stored in the company field 430. Speaker information (for example, voiceprint or the like) for identifying who the user is, is stored in the speaker information field 440. Data in the speaker information field 440 is used to identify a user.

For example, a user ID of "1" represents a speaker "Yamada", a company "company A", and speaker information "voiceprint 1", a user ID of "2" represents a speaker "Tanaka", a company "company A", and speaker information "voiceprint 2", and a user ID of "3" represents a speaker "Okawa", a company "company B", and speaker information "voiceprint 3".

In step S304, the speaker identifying module 120 adds the identified speaker to a meeting speaker list 500. FIG. 5 is an explanatory diagram illustrating an example of a data structure of the meeting speaker list 500. The meeting speaker list 500 includes a No. field 510, a date and time field 520, a user ID field 530, and a company field 540. A number (specifically, a number indicating the order in which the person becomes a speaker) is stored in the No. field 510. The date and time (year, month, date, hours, minutes, seconds, a unit smaller than seconds, or a combination of some of them) when the speaker uttered stored in the date and time field 520. A user ID is stored in the user ID field 530. A company to which the user belongs is stored in the company field 540.

For example, No. 1 represents date and time "utterance time", a user ID "1", and a company "company A", No. 2 represents date and time "utterance time", a user ID "2", and a company "company B", and No. 3 represents date and time "utterance time", a user ID "3", and a company "company C".

In step S306, the organization identifying module 140 determines an output determination. For example, an output destination list 600 is used. FIG. 6 is an explanatory diagram illustrating an example of a data structure of the output destination list 600, The output destination list 600 includes a No. field 610, a company name field 620, and a path field 630. A number is stored in the No. field 610. The name of a company is stored in the company name field 620. A path as an output destination of the company is stored in the path field 630. In this example, an output destination for a company is set for each folder.

For example, No. 1 represents a company name "A" and a path as an output destination for the company A "C:\A", and No. 2 represents a company name "AB" and a path as an output destination for the company AB "C:\AB".

In step S308, the organization identifying module 140 changes the output destination.

In step S310, the output module 145 outputs speech relationship data to each company. For example, company X output information 700 is output. FIG. 7 is an explanatory diagram illustrating an example of a data structure of the company X output information 700.

The company X output information 700 includes a speech information field 710, a recognition result field 720, and an AI information field 730. Speech information is stored in the speech information field 710. A recognition result of the speech information is stored in the recognition result field 720. Information of a result of AI machine learning based on the speech information (furthermore, a recognition result) (for example, a storage location (URL) for a file of a model as a machine learning result or the like) is stored in the AI information field 730.

In step S312, the output module 145 deletes the speech relationship data used for identification of the speaker. Specifically, the company X output information 700 is deleted from the speaker-organization correspondence storing module 135.

FIG. 8 is a flowchart illustrating an example of a process according to the first exemplary embodiment. Specifically, an example of a process for a case where a new speaker appears is illustrated in FIG. 8.

In step S802, speaker is added to the speaker-company list 400.

In step S804, is determined whether or not the name of a company to which the new speaker belongs is present in the output destination list 600. In the case where it is determined in step S804 that the name of the company to which the new speaker belongs is present in the output destination list 600, the process proceeds to step S814. In the case where it is determined in step S804 that the name of the company to which the new speaker belongs is not present in the output destination list 600, the process proceeds to step S806.

In step S806, the company name is added to the output destination list 600.

In step S808, a path name is generated.

In step S810, a folder for the path name is created.

In step S812, an access right is provided to each company.

In step S814, a path of the company name is used. Here, in the case where the determination result in step S804 Yes, the path is an output destination for an existing company. In contrast, in the case where the determination result in step S804 is No, the path is a newly generated output destination.

FIG. 9 is an explanatory diagram illustrating an example of a process according to the first exemplary embodiment.

The information processing apparatus 100 outputs speech information, a recognition result of the speech information, and AI data based on the speech information (hereinafter, speech information and so on) for a period during which the company A participant 201 utters to the company A speech management apparatus 250A. After outputting the speech information and so on, the information processing apparatus 100 deletes the speech information and so on.

Next, the information processing apparatus 100 outputs speech information and so on for a period during which the company B participant 203 utters to the company B speech management apparatus 250B. After outputting the speech information and so on, the information processing apparatus 100 deletes the speech information and so on.

Next, the information processing apparatus 100 outputs speech information and so on for a period during which the company C participant 204 utters to the company C speech management apparatus 250C. After outputting the speech information and so on, the information processing apparatus 100 deletes the speech information and so on.

Next, the information processing apparatus 100 outputs speech information and so on for a period during which the company A participant 201 and the company B participant 203 utter to the company A speech management apparatus 250A and the company B speech management apparatus 250B. After outputting the speech information and so on, the information processing apparatus 100 deletes the speech information and so on.

Figure 10:
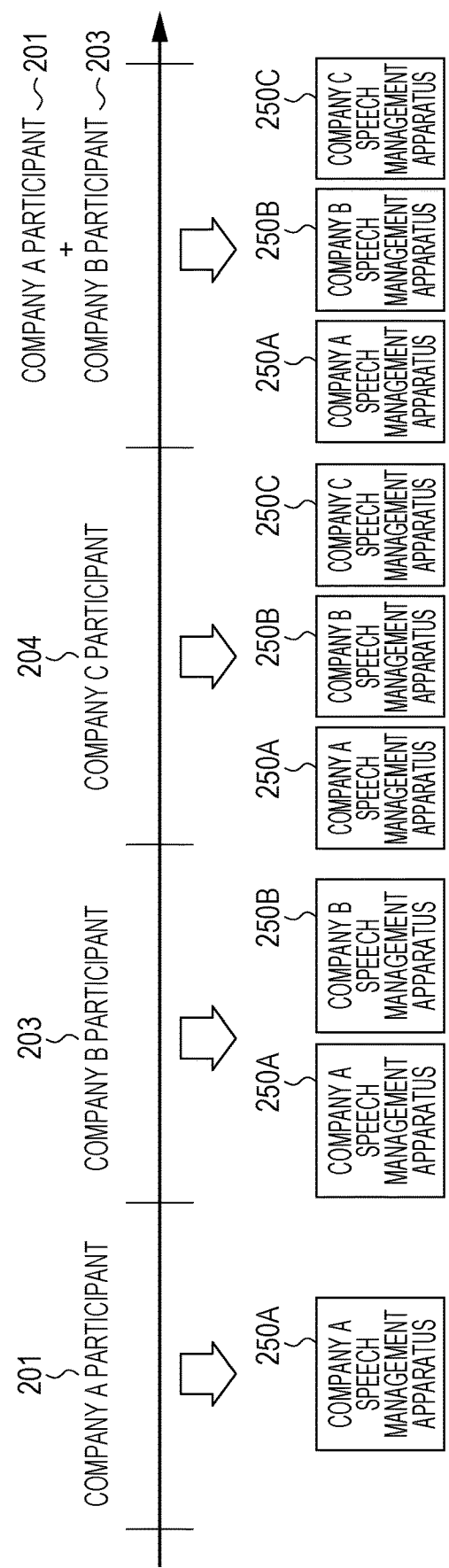
FIG. 10 is an explanatory diagram illustrating an example of a process according to the first exemplary embodiment.

FIG. 10 is an explanatory diagram illustrating an example of a process according to the first exemplary embodiment. In the case where a contract that speech information and so on are shared among the company A, the company B, and the company C is made among the companies A, B, and C, processing described below may be performed. That is, it may be determined whether or not a contract that speech information and so on are shared between an identified company (for example, the company A) and a newly identified company (for example, the company B) is made between the identified company and the newly identified company. In the case where it is determined that the contract is made between the identified company and the newly identified company, output destinations for the companies (for example, the company A and the company B) may be defined as destinations for output. As the "determination as to whether or not a contract is made", specifically, a flag (contract data) reflecting whether or not a contract is made among a plurality of companies (two companies, three companies, or the like) is managed. For the determination of an output destination, information regarding speech information is output to the plurality of companies as output destinations in the case where the flag is on (indicating that a contract is made), whereas information regarding speech information is output to a company to which a speaker belongs as an output destination in the case where the flag is off (indicating that a contract is not made).

For example, in the case where a contract that speech information and so on are shared is made among the company A, the company B, and the company C, the process illustrated in FIG. 10 is performed.

The information processing apparatus 100 outputs speech information and so on for a period during which the company A participant 201 utters to the company A speech management apparatus 250A. After outputting the speech information and so on, the information processing apparatus 100 deletes the speech information and so on.

Next, the information processing apparatus 100 outputs speech information and so on for a period during which the company B participant 203 utters to the company A speech management apparatus 250A and the company B speech management apparatus 250B. After outputting the speech information and so on, the information processing apparatus 100 deletes the speech information and so on.

Next, the information processing apparatus 100 outputs speech information and so on fora period during which the company C participant 204 utters to the company A speech management apparatus 250A, the company B speech management apparatus 250B, and the company C speech management apparatus 250C. After outputting the speech information and so on, the information processing apparatus 100 deletes the speech information and so on.

Next, the information processing apparatus 100 outputs speech information and so on for a period during which the company A participant 201 and the company B participant 203 utter to the company A speech management apparatus 250A, the company B speech management apparatus 250B, and the company C speech management apparatus 250C. After outputting the speech information and so on, the information processing apparatus 100 deletes the speech information and so on.

Second Exemplary Embodiment

Figure 11:
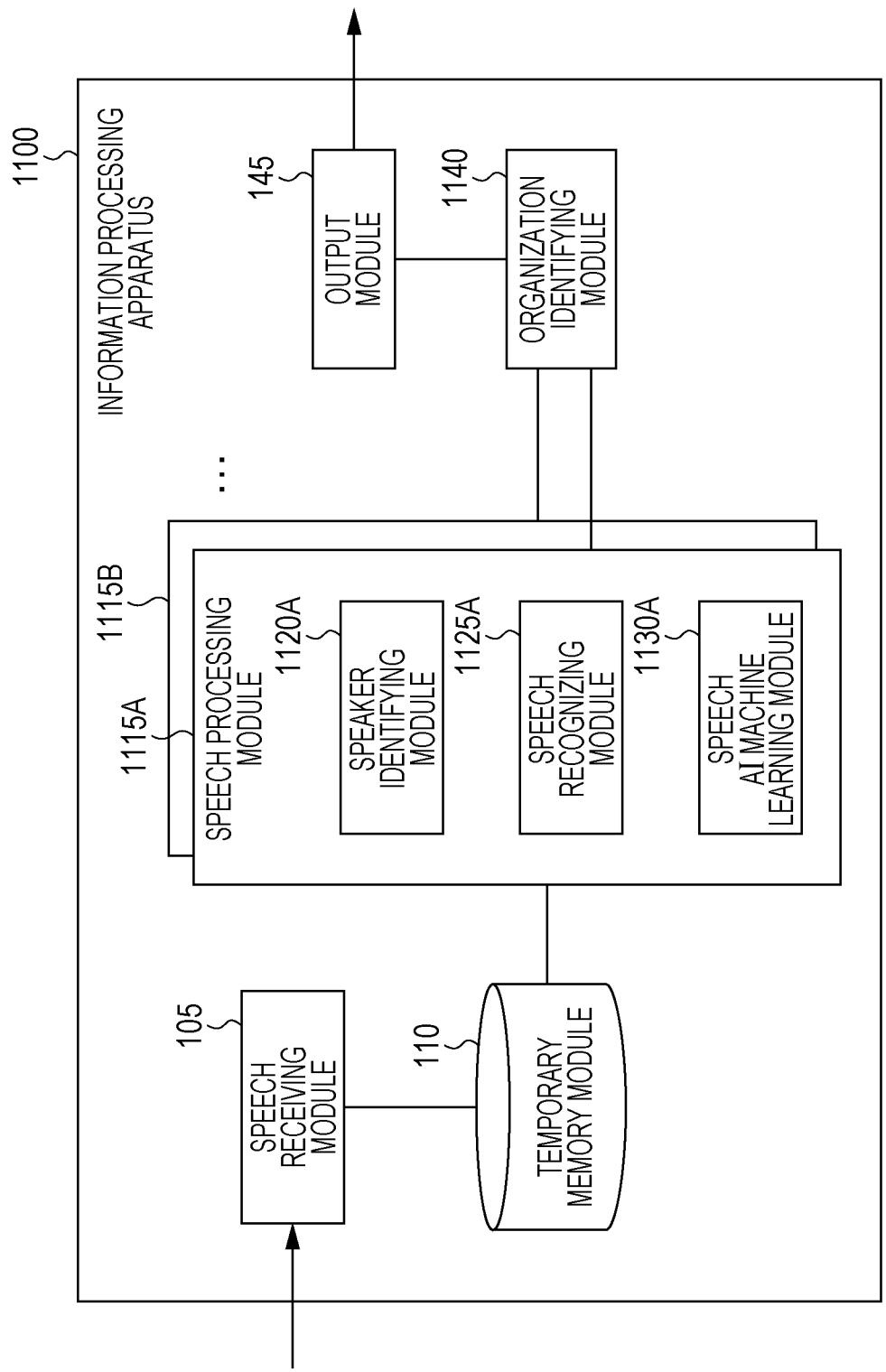
FIG. 11 is a conceptual module configuration diagram illustrating an example of a configuration according to a second exemplary embodiment.

FIG. 11 is a conceptual module configuration diagram illustrating an example of a configuration according to a second exemplary embodiment.

In the second exemplary embodiment, a speech processing module 1115 is provided for each organization. That is, the number of speech processing modules 1115 built in an information processing apparatus 1100 is equal to the number of target organizations. The speech processing modules 1115 may be developed by corresponding organizations or the same speech processing modules 1115 are obtained by reproduction. Even in the case where the same speech processing modules 1115 are obtained by reproduction, data of a speaker who belongs to an organization (so-called dictionary data) is individually prepared by the speaker identifying module 1120, and different AI data are generated by machine learning at a speech AI machine learning module 1130.

Parts of the same type as those in the first exemplary embodiment will be referred to with the same signs, and redundant explanation will be omitted.

The information processing apparatus 1100 includes the speech receiving module 105, the temporary memory module 110, the speech processing module 1115A, the speech processing module 1115B, . . . , an organization identifying module 1140, and the output module 145.

The speech receiving module 105 is connected to the temporary memory module 110.

The temporary memory module 110 is connected to the speech receiving module 105, the speech processing module 1115A, and the speech processing module 1115B.

The speech processing module 1115A is provided for an organization A, includes a speaker identifying module 1120A, a speech recognizing module 1125A, and a speech AI machine learning module 1130A, and is connected to the temporary memory module 110 and the organization identifying module 1140. The speech processing module 1115A has a function equivalent to that of the speech processing module 115, and the speaker identifying module 1120A, the speech recognizing module 1125A, and the speech AI machine learning module 1130A also have functions equivalent to those of the speaker identifying module 120, the speech recognizing module 125, and the speech AI machine learning module 130, respectively. However, the speaker identifying module 1120A, the speech recognizing module 1125A, and the speech AI machine learning module 1130A may be adjusted (tuned) for the organization A. Here, adjustment represents correction of a parameter, an algorithm, or the like to increase the accuracy rate of processing such as identification of a speaker who belongs to the organization A.

The speech processing module 1115B is provided for the organization B and includes the same module as the speech processing module 1115A. However, the speaker identifying module 1120, the speech recognizing module 1125, and the speech AI machine learning module 1130 in the speech processing module 1115B may be adjusted for the organization B.

After an organization is identified by the organization identifying module 1140, the speech processing module 1115 (the speaker identifying module 1120, the speech recognizing module 1125, and the speech AI machine learning module 1130) corresponding to the organization is used. That is, after an organization is identified by the organization identifying module 1140, the speaker identifying module 1120 corresponding to the organization is used. After an organization is identified by the organization identifying module 1140, the speech recognizing module 1125 corresponding to the organization is used. After an organization is identified by the organization identifying module 1140, the speech AI machine learning module 1130 corresponding to the organization is used.

The organization identifying module 1140 is connected to the speech processing module 1115A, the speech processing module 1115B, and the output module 145. The organization identifying module 1140 has a function equivalent to that of the organization identifying module 140. However, an organization is identified according to by which speaker identifying module 1120 the speaker is identified. That is, an organization corresponding to the speaker identifying module 1120 (speech processing module 1115) that identifies the speaker is defined as an output destination.

The output module 145 is connected to the organization identifying module 1140.

Figure 12:
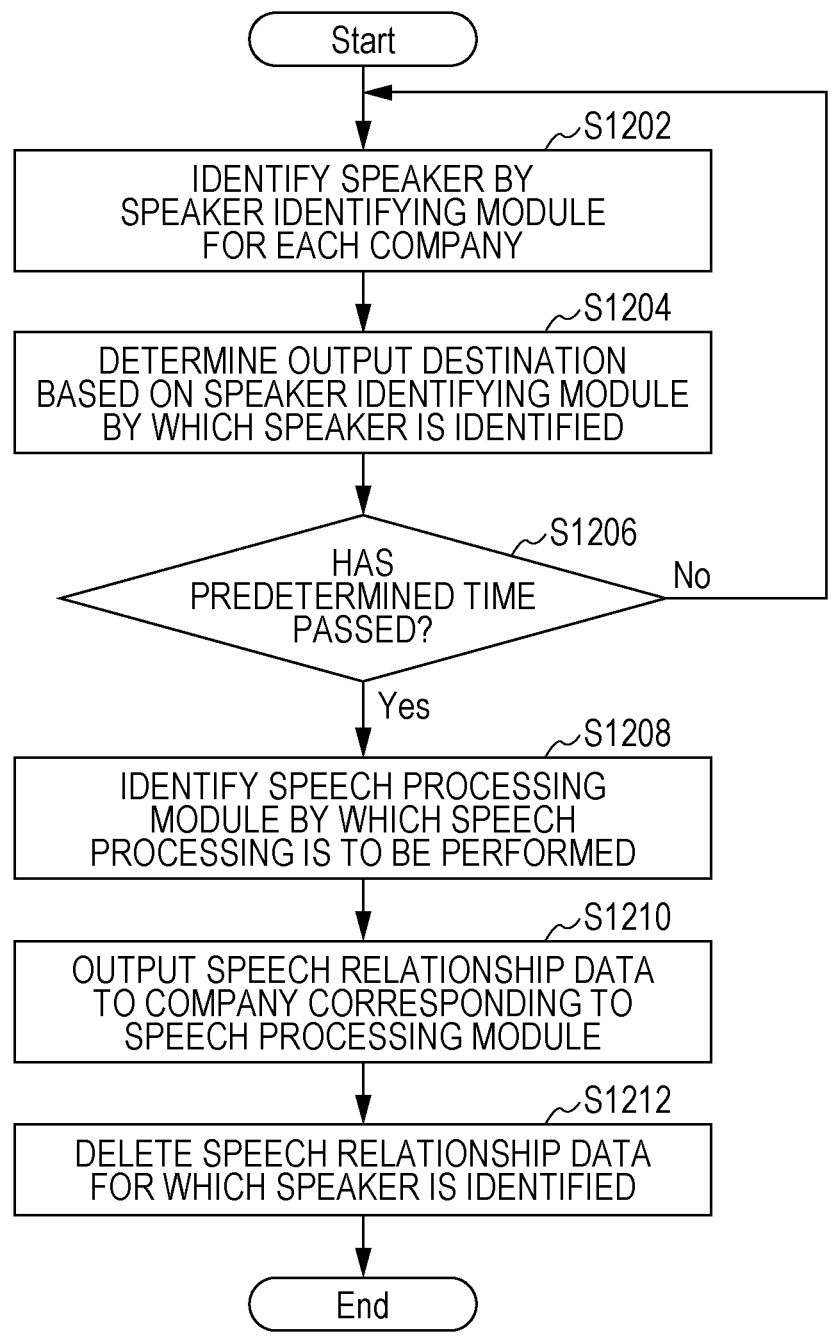
FIG. 12 is a flowchart illustrating an example of a process according to the second exemplary embodiment.

FIG. 12 is a flowchart illustrating an example of a process according to the second exemplary embodiment.

In step S1202, the speaker identifying module 1120 for each company identifies a speaker. Specifically, the speaker identifying modules 1120 of all the speech processing modules 1115 process speech information. There are a speaker identifying module 1120 that is able to specify a speaker (the speaker identifying module 1120 of the speech processing module 1115 allocated to a company to which a speaker belongs) and a speaker identifying module 1120 that is not able to identify a speaker (the speaker identifying module 1120 of the speech processing module 1115 allocated to a company to which a speaker does not belong).

In step S1204, an output destination is determined based on the speaker identifying module 1120 that is able to identify a speaker. That is, a company allocated to the speaker identifying module 1120 (speech processing module 1115) that is able to identify a speaker serves as an output destination.

In step S1206, it is determined whether or not a predetermined time has passed, in the case where the predetermined time has passed, the process proceeds to step S1208. In the case where the predetermined time has not passed, the process returns to step S1202. For example, in the case where merely a response is received, processing by the speech processing module 1115 is not required. In the case where a period during which a person serves as a speaker is equal to or more than the predetermined time, processing by the speech processing module 1115 is performed.

In step S1208, the speech processing module 1115 that is to perform speech processing is identified. Subsequently, speech processing (speech recognition, machine learning, and so on) for the speaker is performed by the speech processing module 1115.

In step S1210, speech relationship data is output to a company corresponding to the speech processing module 1115.

In step S1212, the speech relationship data for which the speaker is identified is deleted. Obviously, speech relationship data used by the different speaker identifying module 1120 in step S1202 (the speaker identifying module 1120 of the speech processing module 1115 allocated to a company that does not serve as an output destination) is also deleted.

Figure 13:
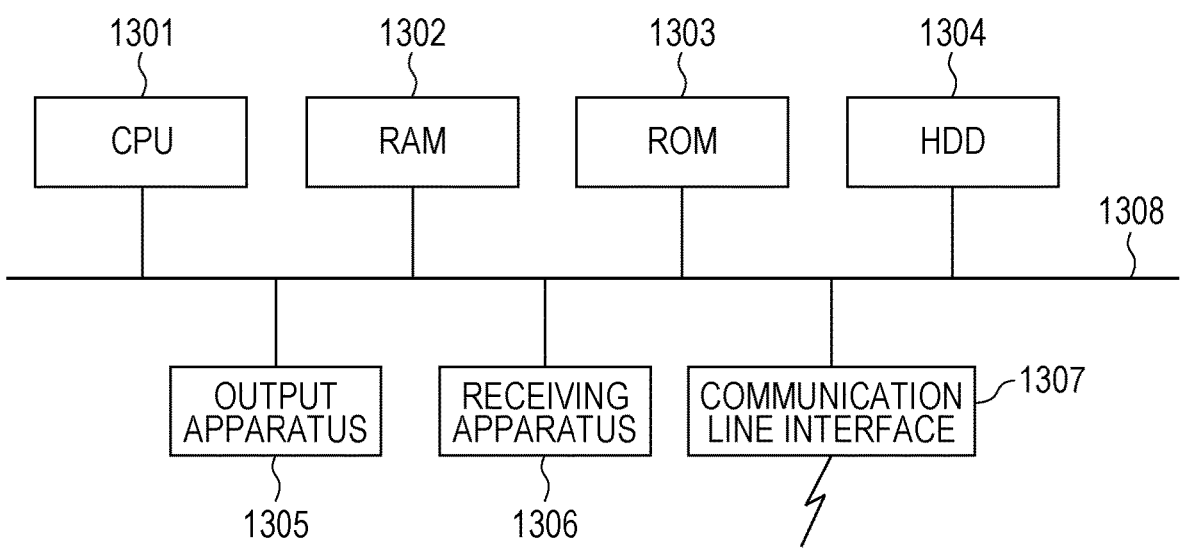
FIG. 13 is a block diagram illustrating an example of a hardware configuration of a computer that implements an exemplary embodiment.

A hardware configuration of a computer that executes a program according to an exemplary embodiment is a general computer, as illustrated in an example of FIG. 13, and specifically, is a personal computer, a computer that may serve as a server, or the like. That is, as a specific example, a CPU 1301 is used as a processor (computing unit), and a RAM 1302, a read only memory (ROM) 1303, and an HDD 1304 are used as a storing device. For example, an HDD, a solid state drive (SSD), which is a flash memory, or the like may be used as the HDD 1304. The computer includes the CPU 1301 that executes programs including the speech receiving module 105, the speech processing module 115, the speaker identifying module 120, the speech recognizing module 125, the speech AI machine learning module 130, the organization identifying module 140, the output module 145, the speech processing module 1115, the speaker identifying module 1120, the speech recognizing module 1125, the speech AI machine learning module 1130, the organization identifying module 1140, and the like, the RAM 1302 that stores the program and data, the ROM 1303 that stores a program and the like to start the computer, the HDD 1304, which is an auxiliary storing device that has functions as the temporary memory module 110, the speaker-organization correspondence storing module 135, and the like, a receiving device 1306 that receives data based on operations (including an operation, speech, a sight line, and the like) of a user for a keyboard, a mouse, a touch screen, a microphone, a camera (including a sight line detection camera or the like), the output device 1305 such as a cathode ray tube (CRT), a liquid crystal display, a speaker or the like, a communication line interface 1307 for allowing connection with a communication network such as a network interface card, and a bus 1308 for allowing connection among the above components and exchange of data. A plurality of computers described above may be connected via a network.

The foregoing exemplary embodiment that relates to a computer program is implemented by causing a system of the above hardware configuration to read the computer program, which is software, in cooperation of software and hardware resources.

The hardware configuration illustrated in FIG. 13 illustrates a configuration example. An exemplary embodiment is not limited to the configuration illustrated in FIG. 13 as long as a configuration which may execute modules explained in the exemplary embodiment is provided. For example, part of the modules may be configured as dedicated hardware (for example, an application specific integrated circuit (ASIC), a reconfigurable integrated circuit (field-programmable gate array (FPGA), or the like), part of the modules may be arranged in an external system in such a manner that they are connected via a communication line, or the system illustrated in FIG. 13 which is provided in plural may be connected via a communication line in such a manner that they operate in cooperation. Furthermore, in particular, part of the modules may be incorporated in a personal computer, a portable information communication device (including a mobile phone, a smart phone, a mobile device, and a wearable computer), an information electronic appliance, a robot, a copying machine, a facsimile machine, a scanner, a printer, or a multifunction device (an image processing device having two or more functions of a scanner, a printer, a copying machine, a facsimile machine, and the like).

In the foregoing exemplary embodiments, if a speaker is not identified, a user interface for registering speakers may be presented so that the name of a speaker (or the name of an organization) may be selected. Furthermore, an output destination for an unidentified speaker may be prepared in advance. Such an output destination may be accessed only by an administrator. In the case where a speaker is not identified, information regarding speech information of the speaker is output to the output destination. In the second exemplary embodiment, in the case where a speaker is not identified, a predetermined speech processing module 1115 may perform speech processing. Then, information regarding speech information for the output destination may be allocated to an appropriate organization by the administrator.

The programs described above may be stored in a recording medium and provided or may be supplied through communication. In this case, for example, the program described above may be considered as a disclosure of "a computer-readable recording medium that records a program".

"A computer-readable recording medium that records a program" represents a computer-readable recording medium that records a program to be used for installation, execution, distribution, and the like of the program.

A recording medium is, for example, a digital versatile disc (DVD), including "a DVD-R, a DVD-RW, a DVD-RAM, etc.", which are the standards set by a DVD forum, and "a DVD+R, a DVD+RW, etc.", which are the standards set by a DVD+RW, a compact disc (CD), including a read-only memory (CD-ROM), a CD recordable (CD-R), a CD rewritable (CD-RW), etc., a Blu-ray™ Disc, a magneto-optical disk (MO), a flexible disk (FD), a magnetic tape, a hard disk, a ROM, an electrically erasable programmable read-only memory (EEPROM™), a flash memory, a RAM, a secure digital (SD) memory card, or the like.

The entire or part of the above-mentioned program may be recorded in the above recording medium, to be stored and distributed. Furthermore, the program may be transmitted through communication, for example, a wired network or a wireless communication network used for a local area network (LAN), a metropolitan area network (MAN), a wide area network (WAN), the Internet, an intranet, an extranet, or the like, or a transmission medium of a combination of the above networks. Alternatively, the program or a part of the program may be delivered by carrier waves.

The above-mentioned program may be the entire or part of another program or may be recorded in a recording medium along with a separate program. Further, the program may be divided into multiple recording media and recorded.

The program may be recorded in any format, such as compression or encryption, as long as the program may be reproduced.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a receiving unit that receives speech information;
   one or more first identifying units that identify a speaker from the speech information;
   a second identifying unit that identifies an organization to which the speaker belongs; and
   an output unit that outputs information regarding the speech information to an output destination corresponding to the organization, wherein
   the outputted information includes at least one of the speech information of utterances spoken by the speaker and text data obtained by speech recognition of the speech information, and
   the output destination is a file path at which the outputted information is stored and can be accessed by the organization.

2. The information processing apparatus according to claim 1,
   wherein the receiving unit receives speech information of a speaker who belongs to a first organization and speech information of a speaker who belongs to a second organization.

3. The information processing apparatus according to claim 2,
   wherein the receiving unit receives a conversation between the speaker who belongs to the first organization and the speaker who belongs to the second organization.

4. The information processing apparatus according to claim 1,
   wherein the output unit outputs the information regarding the speech information to an apparatus that is accessible by the organization identified by the second identifying unit.

5. The information processing apparatus according to claim 4,
   wherein in a case where a plurality of organizations are identified by the second identifying unit, the output unit outputs the information regarding the speech information to an apparatus accessible by the plurality of organizations.

6. The information processing apparatus according to claim 1,
   wherein the one or more first identifying units include a plurality of first identifying units each corresponding to an organization.

7. The information processing apparatus according to claim 6, further comprising:
   a plurality of recognition units each corresponding to an organization,
   wherein the plurality of recognition units each recognize, from the speech information, speech by any speaker who belongs to the corresponding organization.

8. The information processing apparatus according to claim 1,
   wherein the output unit outputs, as the information regarding the speech information, one of or a combination of the speech information, a recognition result of the speech information, and a machine learning result using the speech information.

9. The information processing apparatus according to claim 2,
   wherein the output unit outputs, as the information regarding the speech information, one of or a combination of the speech information, a recognition result of the speech information, and a machine learning result using the speech information.

10. The information processing apparatus according to claim 3,
    wherein the output unit outputs, as the information regarding the speech information, one of or a combination of the speech information, a recognition result of the speech information, and a machine learning result using the speech information.

11. The information processing apparatus according to claim 4,
    wherein the output unit outputs, as the information regarding the speech information, one of or a combination of the speech information, a recognition result of the speech information, and a machine learning result using the speech information.

12. The information processing apparatus according to claim 5,
    wherein the output unit outputs, as the information regarding the speech information, one of or a combination of the speech information, a recognition result of the speech information, and a machine learning result using the speech information.

13. The information processing apparatus according to claim 6,
    wherein the output unit outputs, as the information regarding the speech information, one of or a combination of the speech information, a recognition result of the speech information, and a machine learning result using the speech information.

14. The information processing apparatus according to claim 7,
    wherein the output unit outputs, as the information regarding the speech information, one of or a combination of the speech information, a recognition result of the speech information, and a machine learning result using the speech information.

15. A non-transitory computer readable medium storing a program causing a computer to execute a process for information processing, the process comprising:
    receiving speech information;
    identifying a speaker in accordance with the speech information;
    identifying an organization to which the speaker belongs; and
    outputting information regarding the speech information to an output destination corresponding to the organization, wherein
    the outputted information includes at least one of the speech information of utterances spoken by the speaker and text data obtained by speech recognition of the speech information, and the output destination is a file path at which the outputted information is stored and can be accessed by the organization.

16. An information processing apparatus comprising:

receiving means for receiving speech information;

first identifying means for identifying a speaker in accordance with the speech information;

second identifying means for identifying an organization to which the speaker belongs; and output means for outputting information regarding the speech information to an output destination corresponding to the organization, wherein the outputted information includes at least one of the speech information of utterances spoken by the speaker and text data obtained by speech recognition of the speech information, and the output destination is a file path at which the outputted information is stored and can be accessed by the organization.

17. The information processing apparatus according to claim 1, wherein the information processing apparatus stores a correspondence table in which a plurality of organizations are respectively associated with a plurality of output destinations.

* * * * *